United States Patent [19]
Niino et al.

[11] Patent Number: 5,928,061
[45] Date of Patent: Jul. 27, 1999

[54] WHEEL-HEAD FEED MECHANISM AND GRINDER USING THE SAME

[75] Inventors: Yasuo Niino, Aichi-ken; Masahiro Ido, Kariya; Toshihiko Shima, Okazaki; Eiji Fukuta, Aichi-ken; Hideki Nagano, Nagoya, all of Japan

[73] Assignee: Toyoda Koki Kabushiki Kaisha, Kariya, Japan

[21] Appl. No.: 08/950,799

[22] Filed: Oct. 15, 1997

[30] Foreign Application Priority Data

Oct. 21, 1996 [JP] Japan ................................. 8-278333
Oct. 21, 1996 [JP] Japan ................................. 8-278334

[51] Int. Cl.⁶ .......................... B24B 49/00; B24B 51/00
[52] U.S. Cl. .......................... 451/14; 451/251; 451/243; 451/252
[58] Field of Search ................................. 409/191, 190, 409/235, 231; 408/234, 88, 124; 74/459, 89.15, 424.8 R; 384/111, 118; 451/14, 11, 12, 15, 251, 243, 252, 549, 427, 430, 436

[56] References Cited

U.S. PATENT DOCUMENTS

| | | |
|---|---|---|
| 3,640,590 | 2/1972 | Beisemann ................................. 2/72 |
| 3,650,580 | 3/1972 | Beisemann ................................. 308/9 |
| 3,653,162 | 4/1972 | Clark, Jr. .................................. 451/14 |
| 3,724,138 | 4/1973 | Ishikawa .................................. 451/14 |
| 3,885,353 | 5/1975 | Ota et al. .................................. 451/14 |
| 4,604,853 | 8/1986 | Kimura et al. ............................ 451/14 |
| 4,688,354 | 8/1987 | Nagata et al. ............................ 451/14 |
| 4,913,605 | 4/1990 | Schwartzman ........................... 409/231 |
| 5,009,554 | 4/1991 | Kameyama et al. .................... 409/231 |
| 5,140,863 | 8/1992 | Niino et al. . |
| 5,443,413 | 8/1995 | Pflager et al. ............................ 451/11 |
| 5,499,942 | 3/1996 | Pflager . |
| 5,816,104 | 10/1998 | Sugita et al. ............................. 74/459 |

FOREIGN PATENT DOCUMENTS

| | | |
|---|---|---|
| 57-1169 | 1/1982 | Japan . |
| 60-78153 | 5/1985 | Japan . |
| 8-52631 | 2/1996 | Japan . |

OTHER PUBLICATIONS

Norio Ota, Toyoda Koki Technical Review, vol. 37, No. 2, (serial No. 134), pp. 16–23, "The 18$^{th}$ Japan International Machine Tool Fair", Oct. 1996.

*Primary Examiner*—Timothy Eley
*Assistant Examiner*—Derris Holt Banks
*Attorney, Agent, or Firm*—Oblon, Spivak, McClelland, Maier & Neustadt, P.C.

[57] ABSTRACT

A wheel-head feed mechanism for a grinder comprising a base and a wheel head which is guided by a linear guide section provided on the base and rotatably supports a grinding wheel via a wheel spindle driven by a motor. The wheel-head feed mechanism includes feed screw mechanism composed of a screw shaft and a nut unit engaged with the screw shaft, the feed screw mechanism advancing and retracting the wheel head with respect to a workpiece, and servomotor for rotating one of the screw shaft and the nut unit. The screw shaft is offset from the linear guide section toward the wheel spindle. The nut unit includes a radial hydrostatic bearing section for supporting the root of a male thread of the screw shaft in the radial direction of the screw shaft by hydrostatic pressure, as well as a thrust hydrostatic bearing section for supporting the flanks of the male thread of the screw shaft in the axial direction of the screw shaft by hydrostatic pressure.

13 Claims, 11 Drawing Sheets

2

WHEEL-HEAD FEED MECHANISM AND GRINDER USING THE SAME

BACKGROUND OF THE INVENTION

1. Field of the Invention

The present invention relates to a wheel-head feed mechanism for a highly efficient grinder in which a grinding wheel is fed into a workpiece at high speed in order to efficiently grind the workpiece. The present invention also relates to a grinder that utilizes such a wheel-head feed mechanism.

2. Discussion of the Related Art

Recently, as in the field of cutting work, further improvement in productivity is demanded in the field of grinding work. In grinding work for cam shafts used in automobile engines, there has been employed a so-called plunge grinding scheme in which a grinding wheel is fed toward a cam on a cam shaft—which is rotated about the main spindle axis—in a radial direction thereof. In such plunge grinding, in order to increase the machining efficiency of the cam, attempts have been made to increase the speed of plunge infeed of the grinding wheel toward the cam.

In a conventional cam grinder of such a type, a wheel head is slidably guided by a pair of guides provided on a bed, and is advanced and retracted through use of a feed mechanism in which rotational drive force of a servomotor fixed to the bed is transmitted to the wheel head via a ball-screw mechanism.

More specifically, a nut unit of the ball-screw mechanism is disposed between a pair of guided surfaces of the wheel head, which are formed to correspond to the above-described pair of guide surfaces on the bed, and is fixed to the bottom surface of the wheel head via a bracket. Therefore, a wheel spindle rotatably supported at the upper front portion of the wheel head is quite distant from the axis of the ball-screw in screw-engagement with the nut unit.

Also, in order to eliminate backlash, the nut unit is composed of two nut members that are disposed in tandem with a spacer interposed therebetween.

Further, in the conventional cam grinder, an electric motor is disposed on the rear top surface of the wheel head, and the wheel spindle is driven via a pair of pulleys and belts.

In the wheel-head feed mechanism having the above-described structure, since the nut unit is constituted through tandem disposition of two nut members, the length of the nut unit becomes large, resulting in an inevitable increase in the length of the effective thread portion of the ball screw to be engaged with the nut unit. Consequently, the overall length of the ball-screw apparatus increases. Therefore, the ball-screw apparatus must be disposed under the wheel head parallel thereto in order to reduce the installation space of the cam grinder.

Also, since the overall length of the ball screw is large, when the ball screw is rotated at high speed, influence of rotational deflection of the ball screw becomes remarkable, resulting in deterioration in the feed accuracy of the wheel head, which in turn results in deterioration in the machining accuracy of a ground surface of a workpiece. In order to solve this problem, a deflection absorbing member such as a floating plate must be disposed between the nut unit and the wheel head, or other measures must be taken. Therefore, the conventional wheel-head feed mechanism has had a complicated structure.

Further, since the axis of the ball screw disposed under the wheel head is quite distant in the vertical direction from the axis of the wheel spindle disposed at the upper portion of the wheel head, a grinding resistance acting on the grinding point of the grinding wheel attached to one end of the wheel spindle produces a moment that deviates (or rotates) the wheel head about the engagement point between the nut unit and the ball screw, in a plane perpendicular to the wheel spindle. This moment induces pitching motion of the wheel head, thereby hindering smooth feed, which becomes a cause of deterioration in the machining accuracy of a cam surface. This problem is especially remarkable in a cam grinder in which the grinding point reciprocates while crossing a horizontal plane in which the workpiece spindle and the axis of the wheel spindle lie.

In order to enable high speed feed of the wheel head, it is desired to reduce the mass of the wheel head itself. However, since the wheel head of the conventional cam grinder must be made long in order to secure an installation space for an electric motor for driving the wheel spindle to be mounted on the rear portion of the wheel head, reduction in the size of the wheel head has been difficult.

SUMMARY OF THE INVENTION

In view of the above-described problems, an object of the present invention is to provide a wheel-head feed mechanism adapted to high speed feed, which feed mechanism can decrease the overall length of a nut unit for wheel head feed and the length of the effective thread portion of a screw shaft to be engaged with the nut unit, thereby enabling tandem disposition of the wheel head and the feed mechanism.

Another object of the present invention is to provide a wheel-head feed mechanism which can reduce adverse effect stemming from rotational deflection of the screw shaft to thereby obviate the necessity of a deflection absorbing member such as a floating plate, which has been used in conventional grinders.

Still another object of the present invention is to provide a wheel-head feed mechanism, preferably for a cam grinder, which can reduce the overall size of the grinder, including a wheel head and its feed mechanism, and which can sustain a moment that stems from grinding resistance acting on a grinding wheel and which turns the wheel head in a vertical plane.

Still another object of the present invention is to provide a wheel head feed mechanism which is suitable for a wheel head whose overall length in the feed direction is reduced in order to decrease the mass for facilitating high speed feed.

Still another object of the present invention is to provide a grinder which utilizes the improved wheel-head feed mechanism.

According to the present invention, a screw shaft for feeding a wheel head is disposed directly behind the wheel head such that the screw shaft is parallel to the linear guide section. A male thread having a large lead is formed on the screw shaft. In a nut unit to be screw-engaged with the screw shaft are provided a radial hydrostatic bearing section for supporting the root of a thread of the screw shaft in the radial direction by means of hydrostatic pressure, and a thrust hydrostatic bearing section for imparting static pressure to the flanks of the thread of the screw shaft. Thus, when grinding resistance acts on a grinding wheel on a wheel spindle supported at the front upper portion of the wheel head, the screw shaft imparts a thrust force for opposing the grinding resistance from directly behind the wheel head in order to suppress pitching motion of the wheel head. Accordingly, smooth feed of the wheel head is realized, thereby improving the machining accuracy of workpieces. Through use of the radial hydrostatic bearing section and the thrust hydrostatic bearing section, the nut unit attenuates rotational deflection and vibrations stemming from relative rotation of the screw shaft. Since the screw-engagement between the screw shaft and the nut unit is established via hydrostatic pressure, rotational deflection and vibrations stemming from relative rotation between the screw shaft and the nut unit are attenuated by means of damping action of pressurized fluid. Therefore, the adverse influence of deflection and vibrations on the wheel head is reduced, thereby guaranteeing high machining accuracy.

Preferably, the nut unit is fixed to the wheel head such that the nut unit is inserted into a hole that opens at the rear end of the wheel head. The hole also serves as a reception hole for accommodating the tip end of the screw shaft, which projects from the nut unit toward the front end of the wheel head. This structure reduces the overall length of the wheel head in the reciprocating direction, thereby reducing the weight of the wheel head. This structure is advantageous for high speed feed of the wheel head.

The linear guide preferably includes a pair of first guide ways for guiding the wheel head along a horizontal plane, as well as a single second guide way interposed between the first guide ways and adapted to guide the wheel head along a straight horizontal line. In this case, the screw shaft is disposed such that its axis is offset from the second guide way toward the grinding wheel in a direction perpendicular to the guide ways. When grinding resistance acts on the grinding wheel fixed to one end of the wheel spindle, a moment acts on the wheel head via the wheel spindle in a horizontal direction perpendicular to the guide ways. The moment turns the wheel head in a horizontal plane defined by the first guide ways. The screw shaft imparts a force to the wheel head at a position offset from the second guide way toward the grinding wheel, thereby suppressing yawing of the wheel head.

On the wheel head, a wheel drive motor is preferably disposed coaxially with the wheel spindle, so that the rear end of the wheel head is shortened and lightened. Thus, the wheel head is adapted to high speed feed. More preferably, a support portion of the wheel head for supporting the wheel spindle has a structure such that a built-in motor for rotating the wheel spindle is disposed in the space between a pair of hydraulic bearing units for rotatably supporting the wheel spindle. This structure reduces the overall size of the wheel head.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Embodiments of the present invention will now be described with reference to the drawings.

Figure 1:
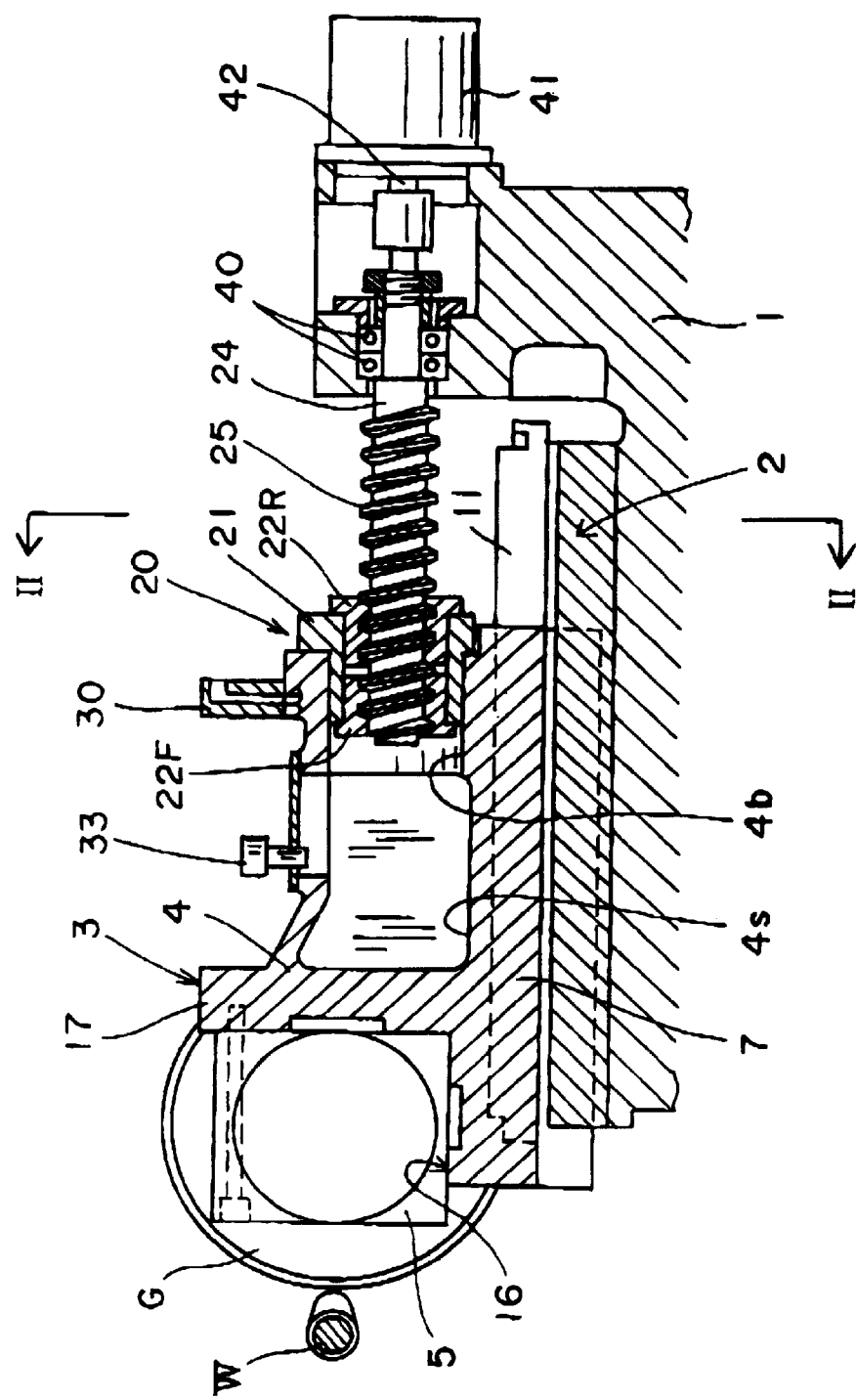
FIG. 1 is a vertical sectional view of a wheel-head feed mechanism according to a first embodiment of the present invention.
Figure 2:
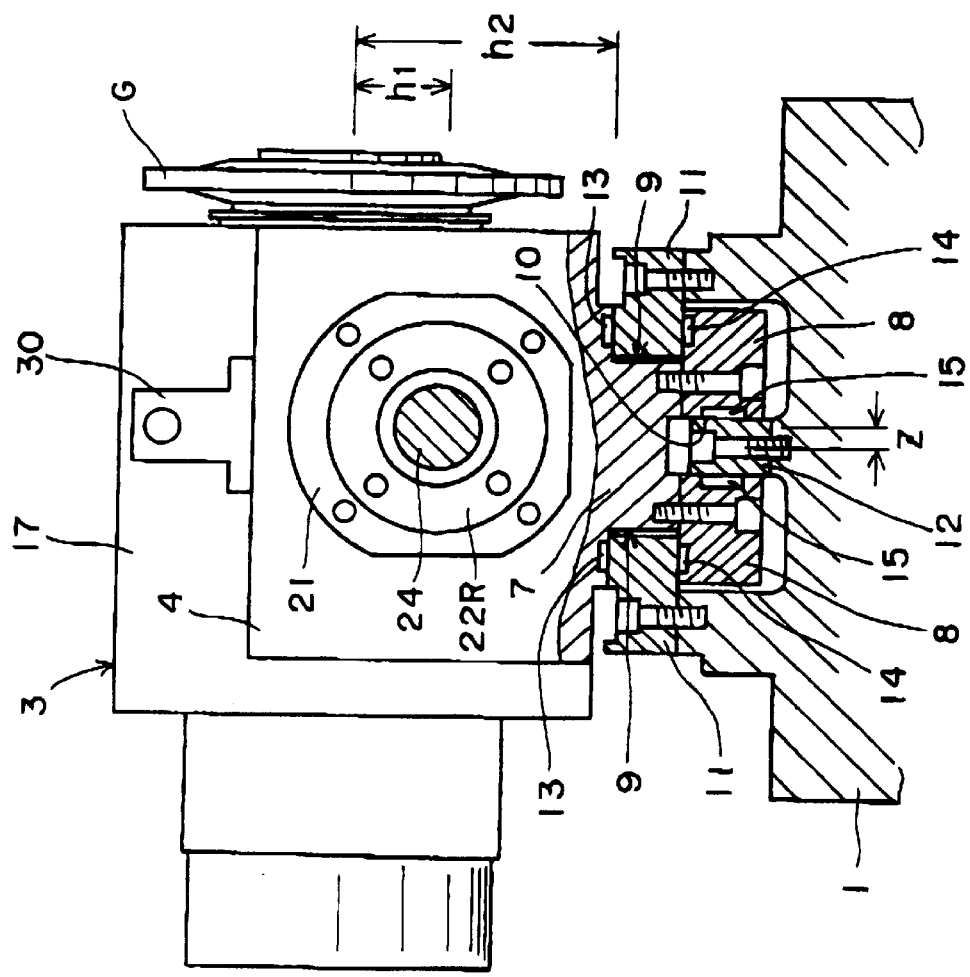
FIG. 2 is a sectional view taken along line II—II in FIG. 1.

First embodiment:

In FIGS. 1 and 2, reference numeral 1 denotes a base of a numerically controlled cam grinder, on which is provided a horizontal linear guide section 2. Along the guide section 2, a wheel head 3 is advanced and retracted in the left and right directions in FIG. 1, respectively. The wheel head 3 is divided into a wheel head body 4, which slides on the base 1, and a wheel spindle support/drive unit 5, which is fixed by bolts to the front end of the body 4.

From the bottom surface of the wheel head body 4 is projected downward a keel portion 7. A pair of guide holding plates 8 are fixed to the bottom surface of the keel portion 7 such that they are separated in a horizontal direction perpendicular to the reciprocation direction of the wheel head body 4. The keel portion 7 and the pair of guide holding plates 8 parallel to the keel portion 7 extend over the entire length of the wheel head body 4 in the reciprocation direction.

Thus, the pair of guide holding plates 8 form a pitching prevention guide groove 9 to either side of the keel portion 7. Each of the pitching prevention guide grooves 9 has a square C-like cross section with the opening facing sideward and extends over the entire length of the wheel head body 4 in the reciprocation direction. Similarly, the pair of guide holding plates 8 form a yawing prevention guide groove 10 under the keel portion 7 at the center thereof. The yawing prevention guide groove 10 has a square C-like cross section with the opening facing downward.

On the base 1 are fixed a pair of horizontal guide plates (first guide ways) 11, which are fitted into the pair of pitching prevention guide grooves 9 with a predetermined clearance therebetween, and a single lateral guide plate (second guide way) 12, which is fitted into the yawing prevention guide groove 10 with a predetermined clearance therebetween. The guide plates 11 and 12 have a sufficient length to cover the sliding stroke of the wheel head body 4 and are disposed parallel to one another.

A plurality of hydrostatic pressure pockets 13 are formed in a bottom surface of the wheel head body 4 located on either side of the keel portion 7 such that each of the hydrostatic pressure pockets 13 faces the top surface of the corresponding horizontal guide plate 11. Also, a plurality of hydrostatic pressure pockets 14 are formed in the top surface of each of the pair of guide holding plates 8 such that each of the hydrostatic pressure pockets 14 faces the bottom surface of the corresponding horizontal guide plate 11.

Moreover, a plurality of hydrostatic pressure pockets 15 are formed in each of the opposing inner side surfaces of the guide holding plates 8 such that each of the hydrostatic pressure pockets 15 faces the corresponding side surface of the lateral guide plate 12. Pressurized fluid is supplied to these hydrostatic pressure pockets 13, 14 and 15 via unillustrated independent throttle elements.

The hydrostatic pressures generated in the hydrostatic pressure pockets 13, 14, and 15 are set to the same pressure. However, if needed, the hydrostatic pressure generated in the hydrostatic pressure pockets 15 may be made different from those generated in the hydrostatic pressure pockets 13 and 14. Alternatively, in order to securely oppose the grinding resistance, the hydrostatic pressures applied to the hydrostatic pressure pockets 13 and 14 located on the grinding wheel G side may be set higher than that applied to the hydrostatic pressure pockets 13 and 14 located on the opposite side.

By virtue of the above-described structure, the wheel head body 4; i.e., the wheel head 3, is advanced and retracted on the base, while being horizontally guided by the pair of horizontal guide plates 11 via the hydrostatic pressure generated in the hydrostatic pressure pockets 13 and 14 and being guided by the lateral guide plate 12, which defines a straight line to be followed, via the hydrostatic pressure generated in the hydrostatic pressure pockets 15.

As shown in FIG. 1, the wheel head body 4 has an L-shaped mounting surface 16 for the above-described wheel spindle support/drive unit 5. The mounting surface 16 is composed of a horizontal mounting surface on which the unit 5 abuts in the vertical direction and a vertical mounting surface on which the unit 5 abuts in the front/back direction. The vertical mounting surface is formed by the front surface of a vertical wall 17 of the wheel head body 4. As is apparent from FIG. 2, a box portion generally having a rectangular parallelepipedic shape is formed behind the vertical wall 17. A hole 4b is formed from the rear end of the box portion; i.e., from the rear end of the wheel head 3. A nut unit 20 is inserted into the hole 4b and is fixed to the rear end surface of the wheel head 3.

Figure 3:
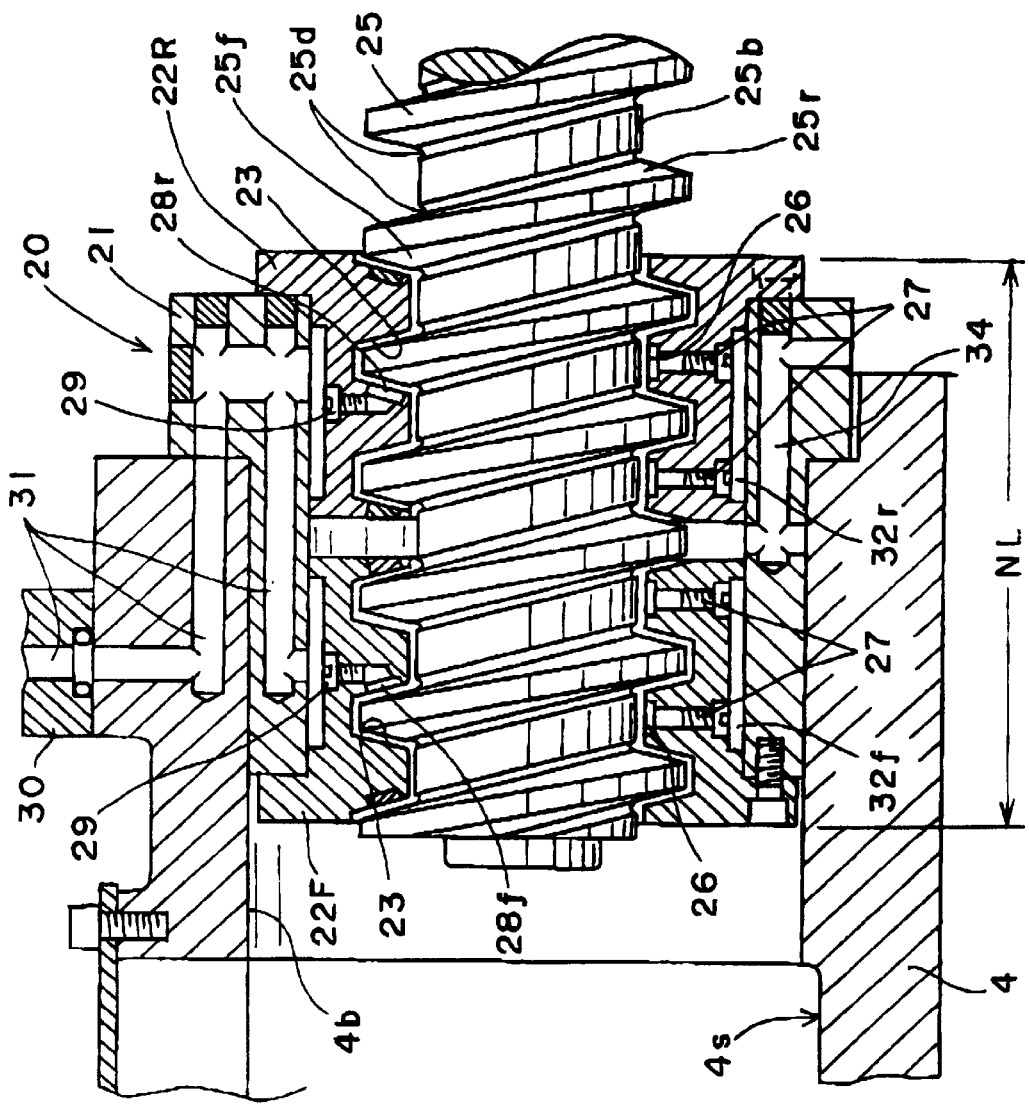
FIG. 3 is an enlarged view of a main portion of a hydrostatic feed screw mechanism used in the first embodiment.

As specifically shown in FIG. 3, the nut unit 20 is composed of a holding sleeve 21 and a pair of sleeve-shaped nuts 22F and 22R. The flange portion of the holding sleeve 21 is fixed by bolts to the wheel head body 4. The nuts 22F and 22R are closely fitted into the inner hole of the sleeve 21 such that the nuts 22F and 22R are coaxially arranged in tandem. Each of the nuts 22F and 22R has a flange portion at one end opposite the end opposing the other nut, and is fixed by bolt to the holding sleeve 21 at the flange portion thereof.

The nuts 22F and 22R have a female thread 23 which is coaxially formed with the inner holes of the nuts 22F and 22R. A male thread 25 of a screw shaft 24 is screw-engaged with the female thread 23. In the present invention, the female thread 23 is constructed such that the female thread 23 provides radial support for the root 25b of the male thread 25 by means of regulated hydraulic pressure, and provides thrust support for flanks 25f and 25r of the male thread 25 by means of regulated hydraulic pressure applied thereto.

Specifically, the male thread 25 is formed in the shape of a high-lead trapezoidal male screw in which the ridge has a trapezoidal axial cross section and which has a large lead. In order to cope with the shape of the male thread 25, the female thread 23 is formed in the shape of a high-lead trapezoidal female screw having a shape complementary to that of the male thread 25.

In order to support the male thread 25 in the radial direction, the crest of the female thread 23 has a flat axial cross section and faces the flat root of the male thread 25 with a predetermined clearance therebetween. For each pitch of the female thread 23, three or four elongated grooves serving as hydrostatic pressure pockets 26 are formed in the flat crest surface of the female thread 23 at constant intervals in the circumferential direction. Pressurized fluid having a regulated pressure is supplied to each of the hydrostatic pockets 26 via an individual throttle 27. By means of the hydrostatic pressure generated in these pockets 26, the male thread 25 is held at the center of the nuts 22F and 22R.

In order to support the nuts 22F and 22R (i.e., the wheel head 3) in the thrust direction with respect to the male screw 25, each of the nuts 22F and 22R has a thrust hydrostatic pressure pocket having a spiral shape. That is, in the nut 22F, a hydrostatic pressure pocket 28f is formed in a flank of the female thread 23 that faces the rear-side flank 25r of the male thread 25, and in the nut 22R, a pocket 28r is formed in a flank of the female thread 23 that faces the front-side flank 25f of the male thread 25. Each of the thrust pockets 28f and 28r is formed in a manner in which a single long groove extending over the entire length of the nut 22F or 22R is formed, and the opposite ends of the grooves are closed.

Each of the thrust hydrostatic pressure pockets 28f and 28r is supplied with pressurized fluid regulated by an individual throttle 29 in order to impart outward hydrostatic pressure to the flanks 25r and 25f of the male screw 25. Thus, the nut unit 20 is positioned at a predetermined position corresponding to the engagement position.

Since the male thread 25 and the nut unit 20 engaged with the male thread 25 have the above-described structures, the overall length NL of the nut unit 20 and the overall length of the male thread 25 can be reduced considerably compared to those in conventional nut units and conventional ball screw shafts. Thus, tandem disposition of the wheel head 3 and the screw shaft 24 is enabled.

Further, a fluid introduction member 30 is fixed to the top surface of the rear portion of the wheel head body 4. Via a flexible pipe or the like, pressurized fluid is supplied from an unillustrated fluid source to the fluid introduction member 30. The pressurized fluid is then supplied to annular grooves 32f and 32r formed in the outer circumferences of the nuts 22F and 22R via a fluid passage 31 formed in the member 30, the wheel head body 4, and the holding sleeve 21. The annular grooves 32f and 32r introduce the pressurized fluid to the radial hydrostatic pressure pockets 26 and the thrust hydrostatic pressure pocket 28f or 28r via the above-described throttles 27 and 29.

Pressurized fluid flowing out from the hydrostatic pressure pockets 26, 28f, and 28r is drained from the front end of the nut unit 20 via a pair of drain grooves 25d formed at opposite edges of the root of the male thread 25. Subsequently, the drained fluid is collected within a box-shaped space 4s in the wheel head body 4. Also, the fluid is drained from the rear end of the nut unit 20 and is collected into an unillustrated oil receiving section formed on the base. The collected fluid is returned from the oil receiving section and the space 4s to the fluid source. Numeral 34 denotes a collection passage for leading to the oil receiving section the fluid that flows out from the space between the opposing end surfaces of the nuts 22F and 22R.

The box-shaped space 4s of the wheel head body 4 also serves as a space for accommodating the reciprocating male thread 25. A communication opening 33 formed in the top surface of the wheel head body 4 establishes communication between the space 4s and the atmosphere.

The rear end portion of the screw shaft 24 is supported on the base 1 via a bearing 40 such that only rotation of the screw shaft 24 is allowed. The rearmost end of the screw shaft 24 is connected to the output shaft of a servomotor 41 fixed to the base 1. As shown in FIG. 1, the rotational axis of the screw shaft 24 horizontally extends at a position considerably higher than the above-described linear guide section 2. Preferably, as shown in FIG. 2, the rotational axis of the screw shaft 24 is offset, from the center between the top surface or vertical center of the horizontal guide plates 11 and the axis of a wheel spindle 50, toward the axis of the wheel spindle 50. That is, the vertical distance h1 between the axis of the wheel spindle 50 and the axis of the screw shaft 24 is not greater than one half of the distance h2 between the top surface or vertical center of the horizontal guide plates 11 and the axis of the wheel spindle 50.

Figure 4:
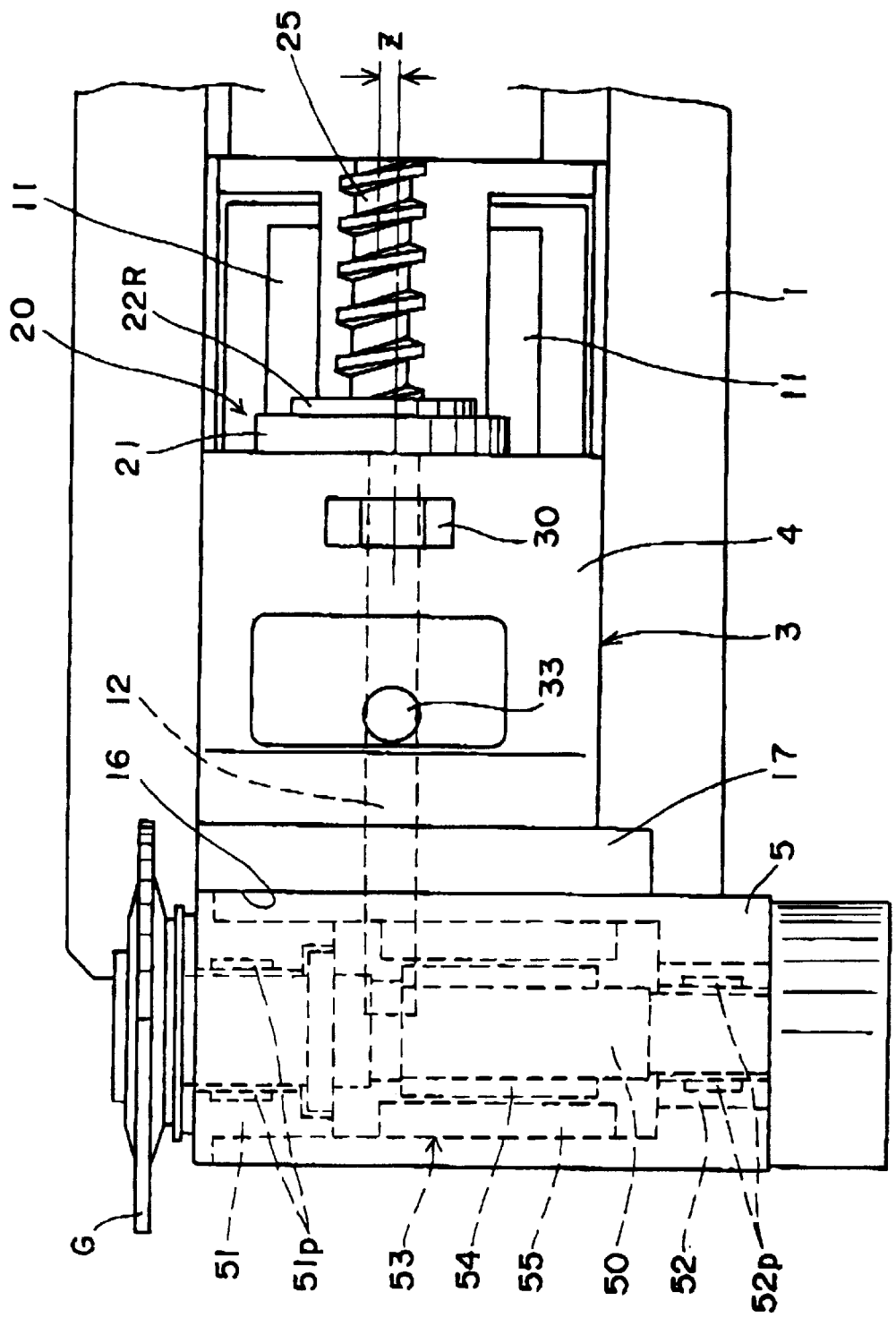
FIG. 4 is a plan view of the wheel-head feed mechanism shown in FIG. 1.

When the wheel head 3 is viewed from above as shown in FIG. 4, the axis of the screw shaft 24 is offset by a distance Z from the center of the lateral guide plate 12 toward the grinding wheel G.

Since the screw shaft 24 is disposed in the above-described manner, when grinding resistance acting on the grinding wheel G produces a force that retracts the wheel head 3 via the wheel spindle 5, the screw shaft 24 opposes that force from directly behind the wheel head 3. Also, when the grinding resistance produces a moment that turns the wheel head 3 about the lateral guide plate 12 via the wheel spindle 50, the screw shaft 24 opposes that moment on the same side as the grinding wheel G with respect to the lateral guide plate 12. Thus, the screw shaft 24 strongly opposes the grinding resistance.

As shown in FIG. 4, the wheel spindle support/drive unit 5 is generally formed in a rectangular parallelepipedic shape that is elongated in a direction perpendicular to the feed direction of the wheel head 3. Within the wheel spindle support/drive unit 5, the wheel spindle 50 is supported to be rotatable about a horizontal axis perpendicular to the feed direction of the wheel head body 4. In order to allow the wheel spindle 50 to rotate while restricting axial movement thereof, a pair of bearing metals 51 and 52 are disposed within the unit 5 and fixed to the opposite ends thereof.

A plurality of hydrostatic pressure pockets 51p are circumferentially arranged within the internal hole of the bearing metal 51, while a plurality of hydrostatic pressure pockets 52p are circumferentially arranged within the internal hole of the bearing metal 52. Regulated pressurized fluid is supplied to each of the pressure pockets 51p and the 52p in order to rotatably support the wheel spindle 50 by means of hydrostatic pressure. Thus, a hydrostatic bearing unit is constituted. A built-in motor 53 is interposed between the bearing metals 51 and 52. The motor 53 is composed of a rotor 54 fitted onto the center portion of the wheel spindle 50 and an electromagnetic coil unit 55 which surrounds the periphery of the rotor 54.

To one end of the wheel spindle 50 is fixed the grinding wheel G. The grinding wheel G has a circular base, and segmented layers of CBN (Cubic Boron Nitride) grinding grains are bonded to the outer circumference of the base. A workpiece W such as a cam shaft (see FIG. 1) is supported by a workpiece support apparatus composed of a spindle head and a tail stock (both unillustrated) and is rotated about a fixed axis in front of the grinding wheel G. The workpiece W is rotated by an unillustrated workpiece-drive servomotor, which is mounted on the spindle head and is controlled synchronously with the servomotor 41 for wheel head feed.

When the servomotor 11 for wheel head feed is driven, the screw shaft 24 is rotated and the nut unit 20 screw-engaged with the screw shaft 24 is reciprocated along the lead of the high-lead trapezoidal thread, in the left and right directions in FIG. 1. As a result, the wheel head 3, which is integral with the nut unit 20, is advanced and retracted with respect to the workpiece W along the linear guide mechanism 2.

At this time, grinding resistance which acts on the grinding wheel G due to engagement with the workpiece W produces a moment within a plane perpendicular to the wheel spindle 50, which moment tends to press the wheel head body 4, especially the rear portion of the wheel head body 4, against the horizontal guide plates 11 of the linear guide mechanism 2. However, the screw shaft 24 disposed directly behind the wheel head 3 effectively cancels that moment, thereby suppressing pitching when the wheel head 3 slides.

Also, since the screw shaft 24 is offset from the lateral guide plate 12 toward the grinding wheel G, the screw shaft 24 effectively suppresses a moment that would otherwise turn the wheel head in a horizontal plane.

In the above-described embodiment, the male thread 25 of the screw shaft 24 is formed in the shape of trapezoidal thread. However, the male thread 25 may be formed in the shape of square thread having a rectangular axial cross section.

Also, the wheel head 3 is divided into the body 14 and the wheel spindle support/drive unit 5 in order to facilitate manufacture thereof. However, the body 14 and the frame of the unit 5 may be formed as a single member.

The layout of the screw shaft 24, the nut unit 20, and the servomotor 41 for producing relative rotation therebetween may be changed. For example, the screw shaft 24 may be fixed to the base 1 such that rotation and axial movement of the screw shaft 24 are both restricted. In such a case, the nut unit 20 is supported at the rear portion of the wheel head body 4 such that only rotation of the nut unit 20 is allowed, and the nut unit 20 is rotated by a servomotor disposed on the wheel head body 4. Alternatively, one end of the screw shaft 24 may be fixed to the wheel head body 4 in a state in which the male thread 25 projects from the rear end of the wheel head base 4. In this case, the nut unit 20 is supported on the base 1 such that only rotation of the nut unit 20 is allowed, and the nut unit 20 is engaged with the male thread 25 of the screw shaft 24. In this modification, the servomotor 41 is mounted on the base 1 to rotate the nut unit 20.

However, the embodiment shown in the drawings—in which the nut unit 20 is fixed to the rear end of the wheel head 3, and the support mechanism (bearing 40) for rotatably supporting the screw shaft 24 and the drive mechanism (servomotor 41) for rotating the screw shaft 24 are disposed on the base 1—is superior to the above-described modifications. That is, since the nut unit 20 and the mechanism for supporting and driving the screw shaft 24 can be separated to be disposed on the wheel head 4 and the base 1, respectively, the mass of the wheel head 3 can be reduced, and the support mechanisms for the screw shaft 24 and the nut unit 20 can be simplified, so that sufficient rigidity can be imparted to the support mechanisms in order to sustain stresses in the thrust direction. Moreover, the screw shaft 24 can be driven by the servomotor 24 in a direct-drive scheme.

Second Embodiment:

A second embodiment of the present invention will be described with reference to FIGS. 5–11.

Figure 5:
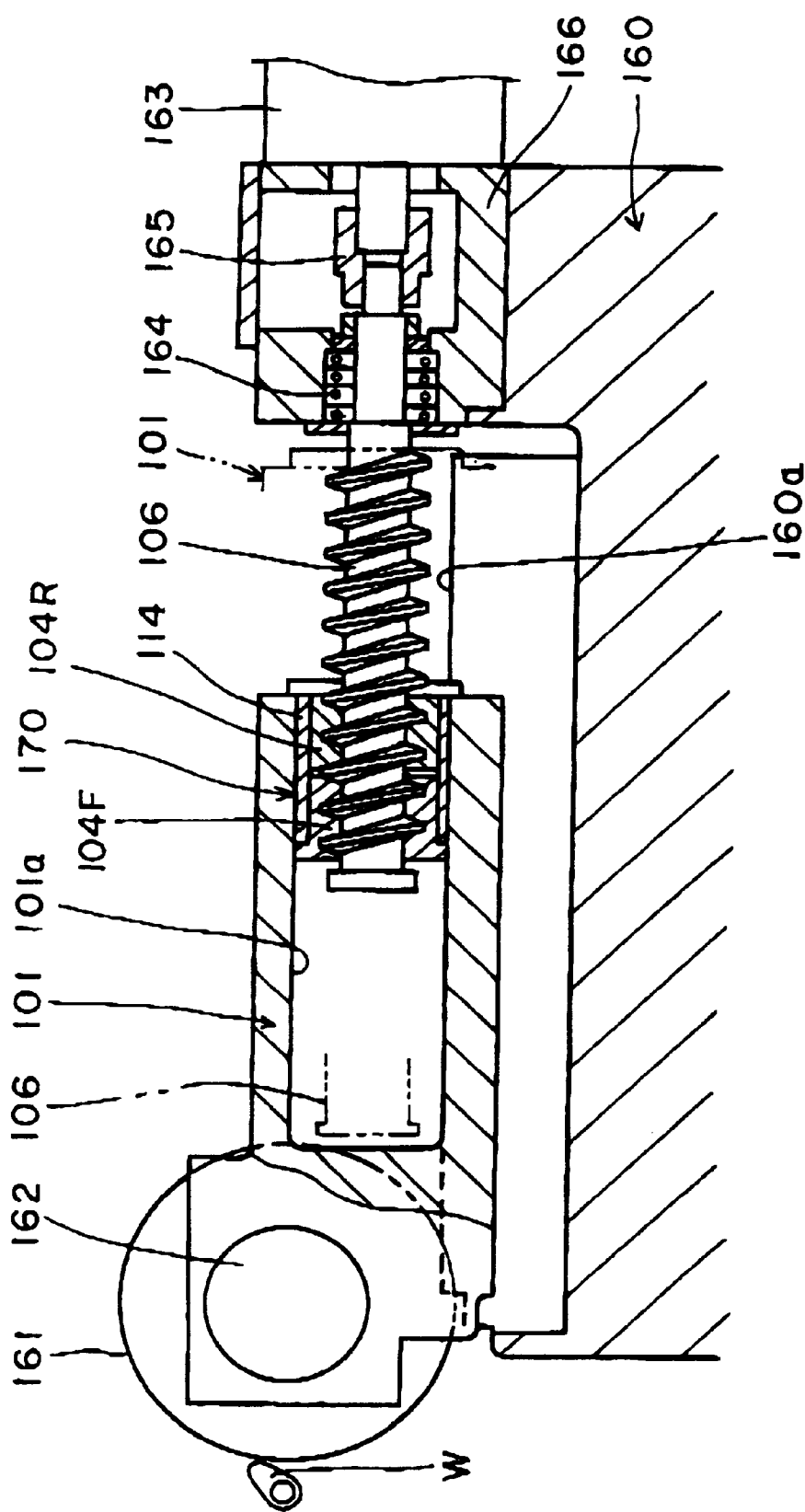
FIG. 5 is a vertical sectional view of a wheel-head feed mechanism according to a second embodiment of the present invention.

FIG. 5 shows a wheel head 101 used for grinding a workpiece W such as a cam shaft, which is rotatably supported by an unillustrated support means. The wheel head 101 is guided by a guide surface 160a provided on a base 160 such that the wheel head 101 can slide in the left and right directions in FIG. 5. At the front end of the wheel head 1, there is rotatably supported a grinding wheel 161 for grinding the workpiece W. The grinding wheel 161 is rotated by an unillustrated servomotor via a wheel spindle 162, which is disposed coaxially with the grinding wheel 161.

A cylindrical space 101a is formed from the rear end of the wheel head 101, and the tip end of the feed screw (screw shaft) 106 is inserted into the space 101a. A hydrostatic feed screw unit 170 is attached to the rear end of the space 101a. The hydrostatic feed screw unit 170 is mainly composed of a pair of nuts 104F and 104R and the feed screw 106. On the rear end of the base 160 is disposed a mounting block 166, to which a servomotor 163 for rotating the feed screw 106 is attached. Ball bearings 164 for rotatably supporting the rear end of the feed screw 106 are fitted into one end of the mounting block 166, while the servomotor 163 is attached to the other end of the mounting block 166. The feed screw 106 is coupled with the output shaft of the servomotor 163 via a coupling 165 within the mounting block 166.

Next, the hydrostatic feed screw unit 170 will be described with reference to FIGS. 6–11.

Figure 7:
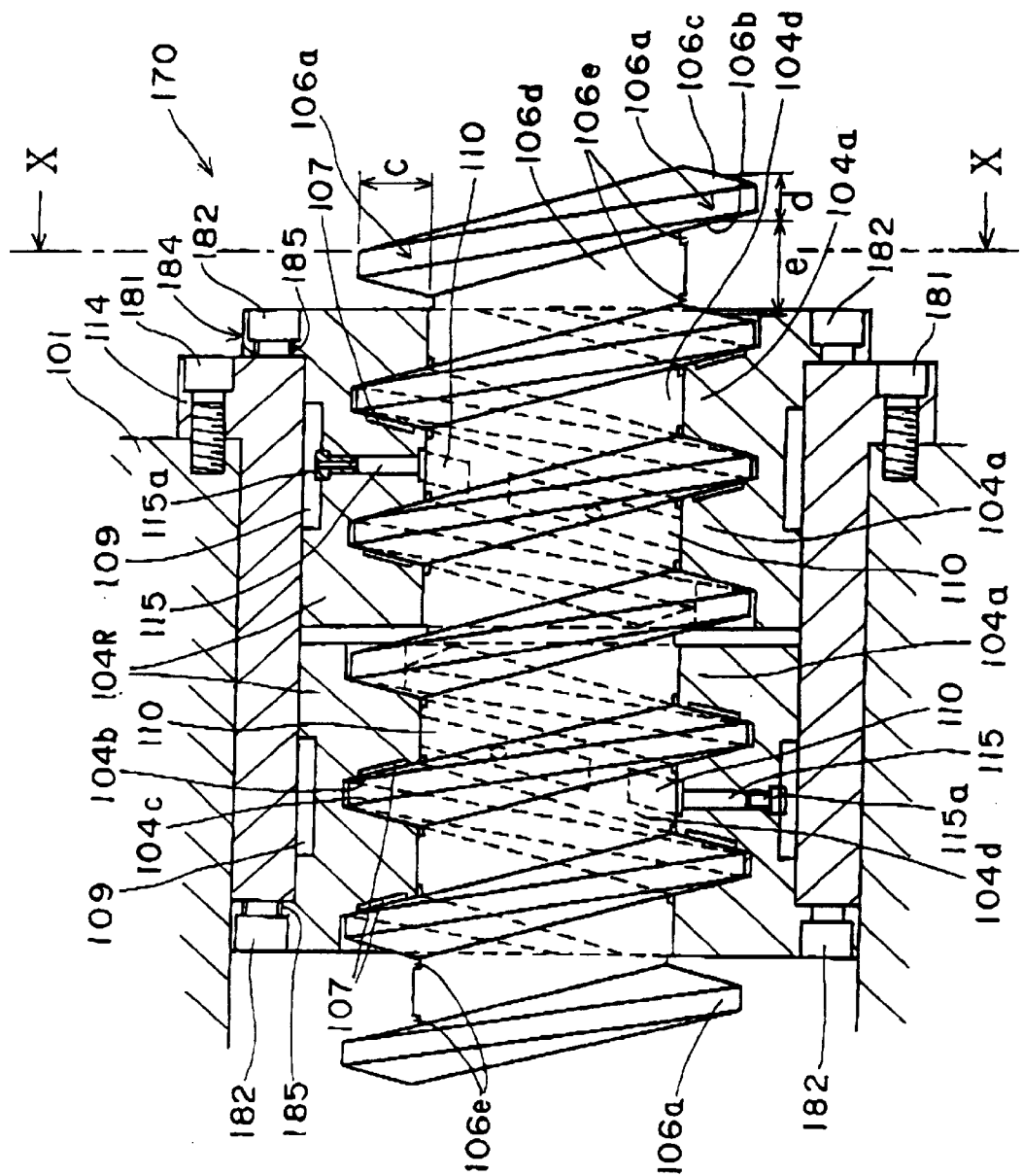
FIG. 7 is a sectional view of the hydrostatic feed screw mechanism of FIG. 6 at a different phase.
Figure 10:
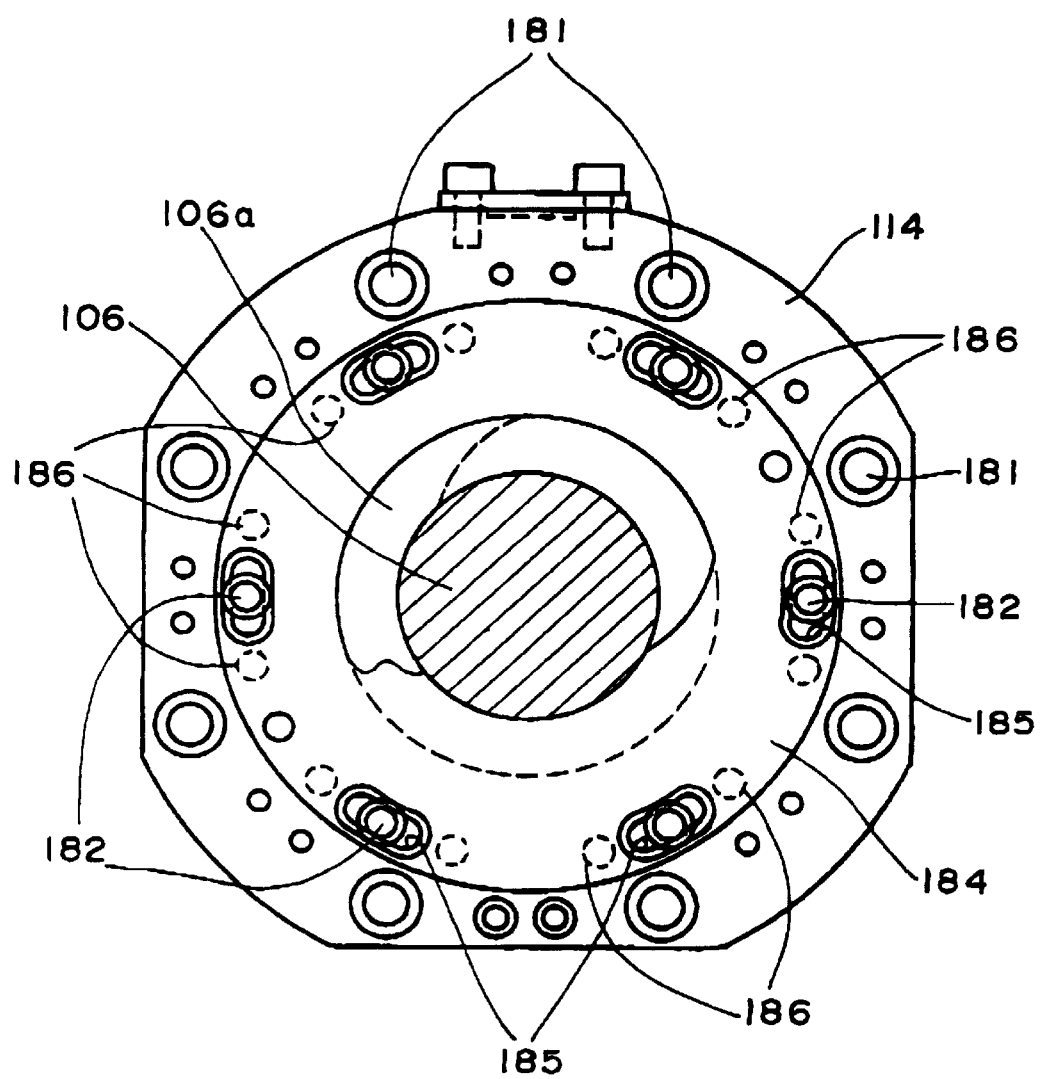
FIG. 10 is a sectional view taken along the line X—X in FIG. 7.

The hydrostatic feed screw unit 170 includes a cylindrical passage member 114. The pair of nuts 104F and 104R are attached to the passage member 114 from the opposite ends thereof, and are screw-engaged with the feed screw 106. As shown in FIG. 7, the passage member 114 is fixed to the wheel head 101 by bolts 181. Each of the nuts 104F and 104R has a flange portion 184 at the outer end thereof, so that the passage member 114 is sandwiched between the flange portions 184. The flange portions 184 have elongated holes 185, and bolts 182 are passed through the elongated holes 185 and screwed into the passage member 114 in order to fix the nuts 104F and 104R to the passage member 114. As shown in FIG. 10, the elongated holes 185 are provided at several locates in the circumferential direction. Through rotation of the rear nut 104R, the angular phase of the rear nut 104R relative to the front nut 104F can be freely set before fixation of the rear nut 104R to the passage member 114. This angular phase adjustment enables the adjustment of the clearance between the flank 104b of the female thread 104a of the nut 104R (104F) and the flank 106b of the ridge 106a of the male thread of the feed screw 106 in a state in which the nuts 104F and 104R and the feed screw 106 are assembled.

Figure 8:
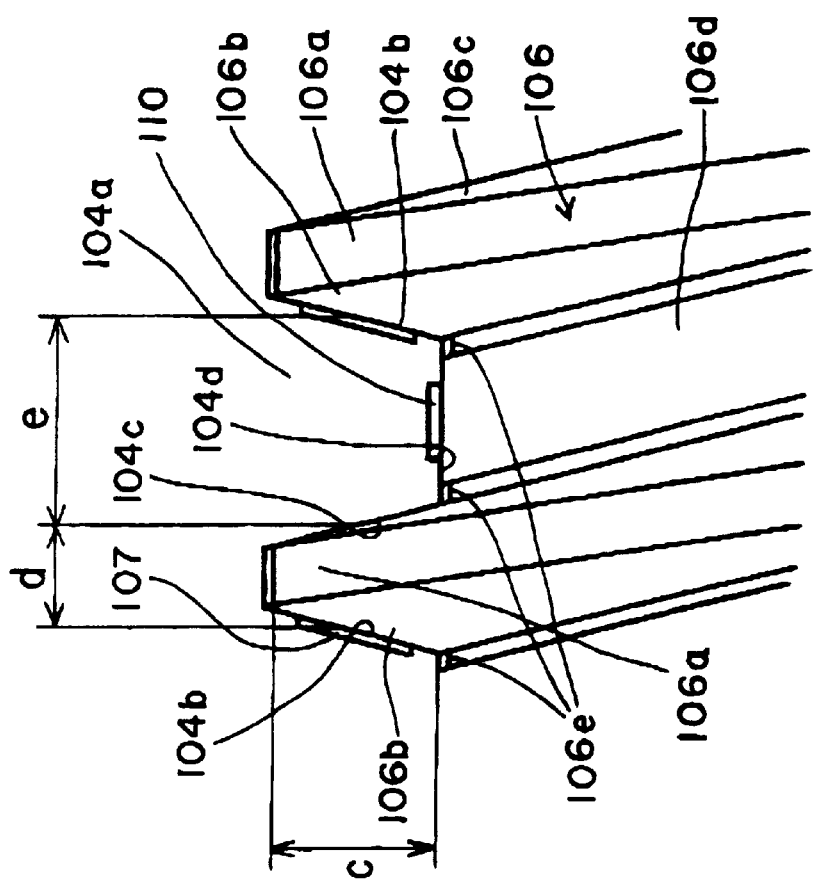
FIG. 8 is a detailed view of the screw-engagement portion where the nut and the feed screw are screw-engaged with each other.

Next, the feed screw 106 will be described in more detail. As shown in FIG. 7, the feed screw 106 is a trapezoidal screw in which the ridge has a trapezoidal cross section. In order to move the wheel head 101 at high speed, the feed screw 106 has a large lead and an increased rigidity. That is, as shown in FIG. 8, the width d of the ridge 106a of the male thread of the feed screw 106 is set smaller than the width e of the ridge 4a of the female thread of the nut 104F (104R). More specifically, the ratio d/e is set smaller then 2/3. Through such setting, the pitch of the feed screw 106 can be increased in order to increase the lead.

In the feed screw 106, in order to increase the pressure reception area of a thrust hydrostatic pressure pockets 107 serving as a hydrostatic support section for the thrust direction to thereby enhance the rigidity in the thrust direction, the height c of the male screw ridge 106a is increased. Although such a design increases the inertia generated due to rotation of the feed screw 106, such an increase in the inertia can be prevented through reduction of the width d of the ridge 106a of the male thread.

Figure 9:
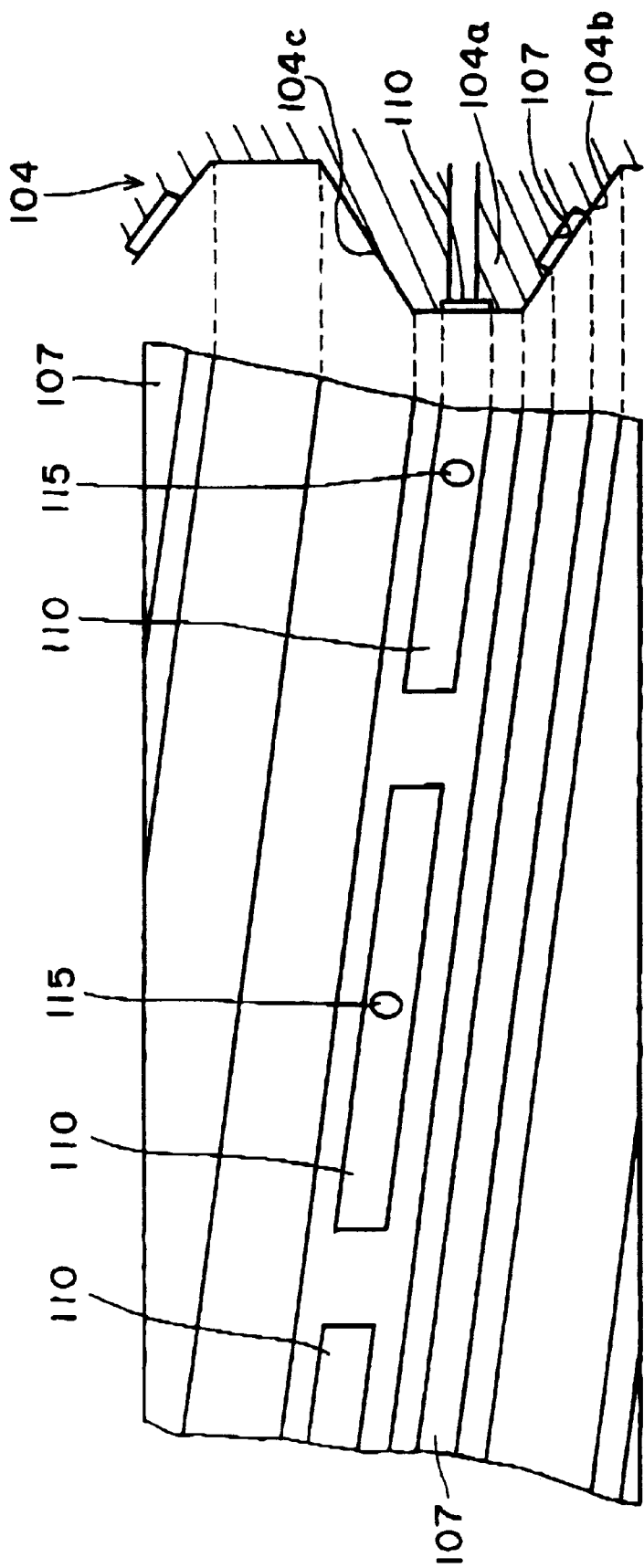
FIG. 9 is a development of the nut used in the second embodiment.

In the hydrostatic feed screw unit 170, two kinds of hydrostatic pressure pockets are provided. That is, as shown in FIG. 9, there are provided thrust hydrostatic pressure pockets 107 each of which has a continuous spiral shape and which provide hydrostatic support in the thrust direction, and radial hydrostatic pressure pockets 110 each of which is divided into a plurality of elongated grooves and which provide hydrostatic support in the radial direction.

Figure 6:
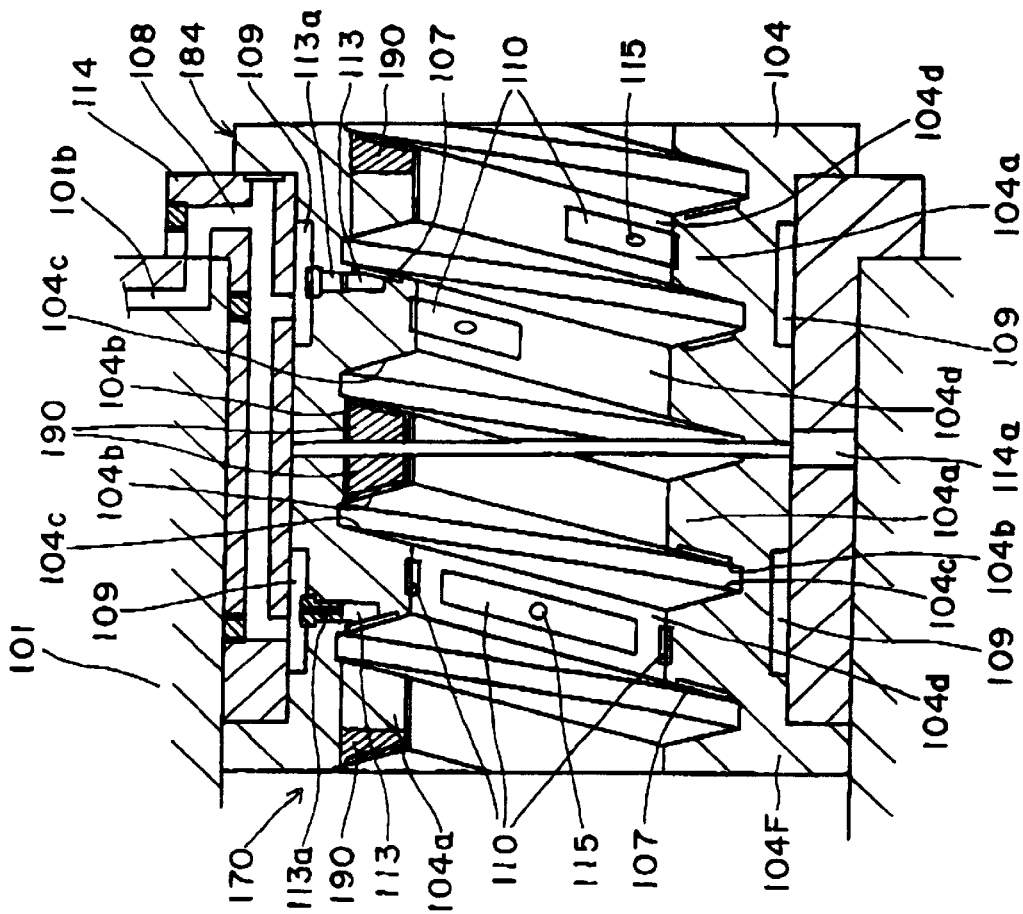
FIG. 6 is a sectional view of a hydrostatic feed screw mechanism used in the second embodiment.

As shown in FIGS. 6 and 7, the thrust hydrostatic pressure pocket 107 is formed in and along the flank 104b of the female thread of the nut 104F (104R), which flank faces the flank 106b of the male thread; i.e., the flange 184. The thrust hydrostatic pressure pocket 107 is formed as a spiral groove which extends to the opposite ends of the nut 104F (104R), and whose opposite ends are closed by plugs 190.

Therefore, the thrust hydrostatic pressure pocket 107 is formed in the left-side flank 104b in the front nut 104F, and is formed in the right-side flank 104b in the rear nut 104R.

As shown in FIG. 6, the thrust hydrostatic pressure pockets 107 are connected to an unillustrated fluid source such as a pump via a supply passage 108 formed in the passage member 114, outer circumferential grooves 109 formed in the outer circumferences of the nuts 104 and communicating with the supply passage 108, and thrust supply passages 113 which extend from the outer circumferential grooves 109 to the thrust hydrostatic pressure pockets 107. Further, independent throttles 113a are disposed within the thrust supply passages 113 in the vicinity of the thrust hydrostatic pressure pockets 107. The supply passage 108 is connected to a supply passage 101b provided within the wheel head 101, and the unillustrated fluid source is connected to the supply passage 101b via a flexible pipe.

As shown in FIG. 7, one set of the radial hydrostatic pressure pockets 110 is provided for each nut 104. Accordingly, in the hydrostatic feed screw unit 170, both ends of a portion of the feed screw 106 screw engaged with the hydrostatic feed screw unit 170 are supported by two sets of the radial hydrostatic pressure pockets 110.

The radial hydrostatic pressure pockets 110 constituting the corresponding set are formed in the crest surface of the ridge 104a of the female thread which opposes the root of the male thread of the feed screw 106. The radial hydrostatic pressure pockets 110 are disposed at constant intervals within an area corresponding to one turn of the spiral.

Preferably, three radial hydrostatic pressure pockets 110 are disposed at intervals of 120° in the area corresponding to one turn of the spiral, and the circumferential length of the radial hydrostatic pressure pockets 110 is about one tenth the one-turn circumferential length of the spiral. Thus, the later described centering performance can be maximized. Also, since the size of the radial hydrostatic pressure pockets 110 can be increased through an increase in the lead length of the female thread, a larger hydrostatic pressure in the radial direction (an increased radial rigidity) can be obtained.

Similar to the case of the thrust hydrostatic pressure pockets 107, the radial hydrostatic pressure pockets 110 are connected to the unillustrated fluid source such as a pump via the supply passage 108 formed in the passage member 114, the outer circumferential grooves 109 formed in the outer circumferences of the nuts 104 and communicating with the supply passage 108, and thrust supply passages 115 which extend from the outer circumferential grooves 109 to the radial hydrostatic pressure pockets 110. Further, independent throttles 115a are disposed within the radial supply passages 115 in the vicinity of the radial hydrostatic pressure pockets 110. The pressures generated within the thrust hydrostatic pressure pockets 107 and the radial hydrostatic pressure pockets 110 can be arbitrarily adjusted through replacement of the throttles 13a and 15a.

The pressurized fluid supplied to the thrust hydrostatic pressure pockets 107 and the radial hydrostatic pressure pockets 110 flows out of the nuts 104F and 104R through clearance formed between the nuts 104F and 104R and the feed screw 106. To make the drain of fluid smooth, as shown in FIG. 8, drain grooves 106e are formed along the boundaries between the ridge 106a and the root of the male thread. The fluid drained from the nuts 104F and 104R are collected into an unillustrated oil collection groove provided on the base 101 shown in FIG. 5 and is used again.

In FIG. 6, a drain hole 114a formed in the passage member 114 at a position between the nuts 104F and 104R collects fluid drained from the space between the nuts 104F and 104R and feeds it to an unillustrated oil collection groove. Since the opposite ends of the thrust hydrostatic pressure pockets 107 are closed by the plugs 190, fluid is prevented from directly flowing out of the thrust hydrostatic pressure pockets 107 in a large amount.

Next, the operation of the second embodiment will be described. When the feed screw 106 is rotated by the servomotor 63, the wheel head 101 moves along the guide surface 160a. At this time, since the fluid source is operated, pressure fluid is supplied to the thrust hydrostatic pressure pockets 107 via the supply passage 108, the outer circumferential grooves 109, the thrust supply passages 113 and the throttles 113a. Similarly, pressure fluid is supplied to the radial hydrostatic pressure pockets 110 via the supply passage 108, the outer circumferential grooves 109, the radial supply passages 115 and the throttles 115a. Thus, hydrostatic pressure is generated between the flank 106b of the male thread of the feed screw 106 and the flank 104b of the male thread of the nut 104F (104R). Also, hydrostatic pressure is generated between the root 106b of the male thread of the feed screw 106 and the crest surface 104d of the ridge 104a of the female thread of the nut 104F (104R).

Accordingly, the thrust hydrostatic pressure pockets 107, formed in the pair of nuts 104F and 104R such that they face opposite directions, produce hydrostatic pressures in opposite directions, thereby effecting the centering action. As a result, the ridge 106a of the male thread is positioned at the center between the flanks 104b and 104c of the nut 104F (104R), and a large thrust rigidity can be obtained. Due to the pressurized fluid supplied to the thrust hydrostatic pressure pockets 107, the nut 104F (104R) is urged toward the center of the passage member 114; i.e., toward the direction opposite to the flange 184, so that the flange 184 is pressed against the passage member 114. Thus, the tension of the bolts 182, which fix the nuts 104F and 104R, is prevented from affecting the rigidity.

Also, the center axis of the feed screw 106 is maintained at the center axis of the nuts 104F and 104R by the centering action of the hydrostatic pressure generated in the three radial hydrostatic pressure pockets 110 independent of one another in the circumferential direction, so that improved radial rigidity is obtained.

As described above, sufficient rigidity is obtained in both thrust and radial directions. Also, since the rotational deflection and vibrations of the feed screw 106 are attenuated by the hydrostatic pressure, the wheel head 101 can be smoothly moved at high speed.

In order to adjust the hydrostatic rigidity in the thrust direction, at least one of the nuts 104F and 104R is made ratable by loosening the corresponding bolts 182, and then is rotated within a range corresponding to the length of the elongated holes 185 in order adjust the clearances between the flanks 104b of the female threads of the nuts 104F and 104R and the flanks 106b of the male thread of the feed screw 106. Thus, the hydrostatic pressure generated in the thrust hydrostatic pressure pockets 107 is adjusted. That is, the rear nut 104R is rotated clockwise, the rear nut 104R moves rightward relative to the front nut 104F, so the clearances between the flanks 104b of the female threads of the nuts 104F and 104R and the flanks 106b of the male thread of the feed screw 106 decreases. Consequently, the pressure in the thrust hydrostatic pressure pockets 107 increases, and the rigidity in the thrust direction is increased. At this time, due to the centering action of the right-side and left-side thrust hydrostatic pressure pockets 107, the ridge 106a of the male thread of the feed screw 106 is automatically positioned at the center between the flanks 104b and 104c of the nuts 104F and 104R.

Further, as shown in FIG. 10, a plurality of extra bolt holes 186 are formed in the passage member 114. Therefore, when the nut 104F (104R) is rotated over a distance greater than the length of the elongated holes 185, the bolts 185 may be screwed into the extra bolt holes 186.

In the above-described embodiment, the thrust hydrostatic pockets 107 are formed in the shape of a spiral groove extending along the flanks 104b of the female thread of the nut 104F (104R). Therefore, most of the pressure generated in the thrust hydrostatic pockets 107 acts in the thrust direction, so that sufficient thrust rigidity can be obtained.

In the above-described embodiment, the servomotor 162 is disposed on the base 160 and the wheel head 101 is moved through rotation of the feed screw 106. However, the structure may be modified such that the servomotor is disposed on the wheel head and the feed screw is fixed to the base, and that the wheel head is moved through rotation of the nut by the servomotor.

Figure 11:
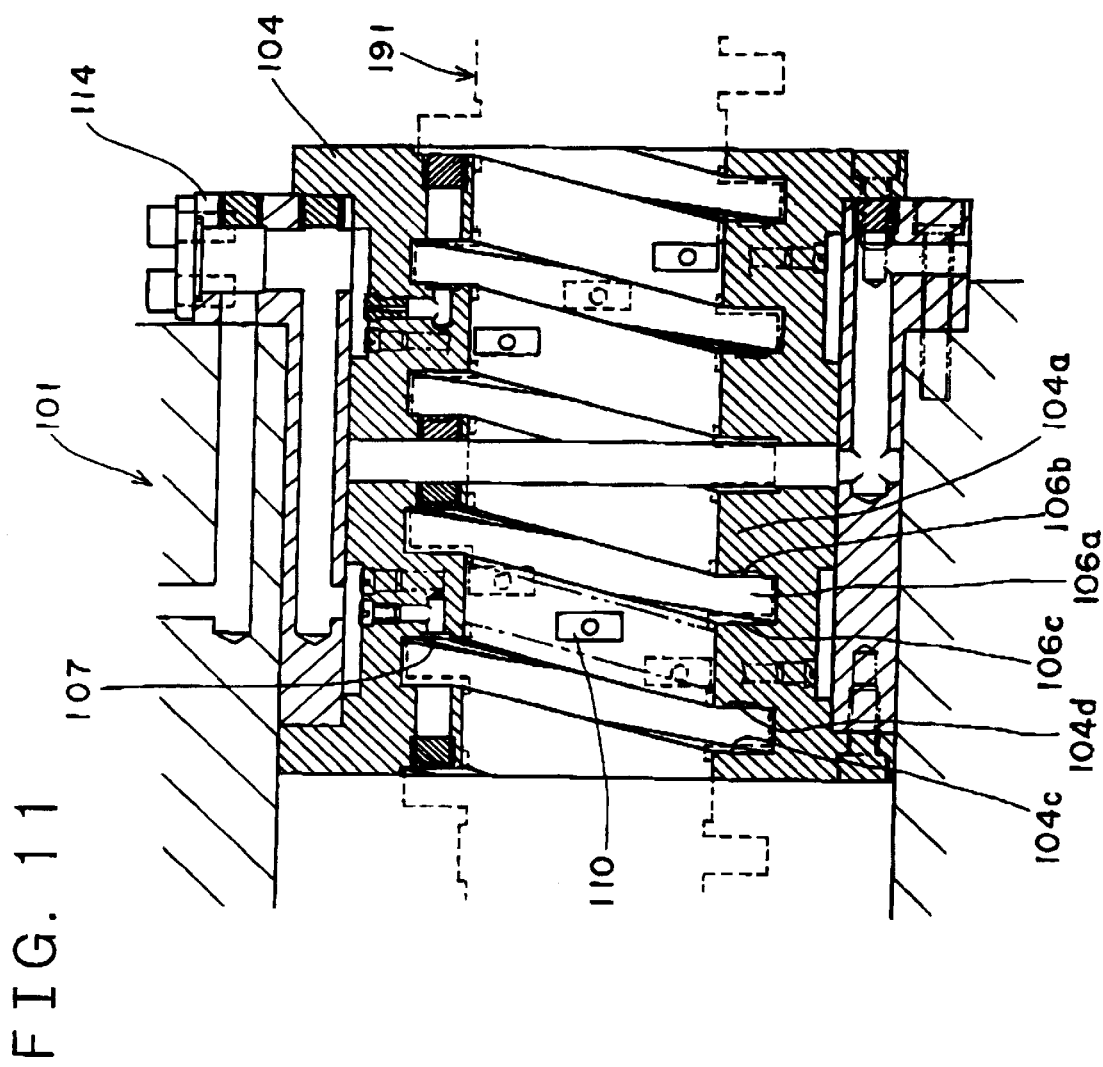
FIG. 11 is a sectional view of a hydrostatic feed screw mechanism showing a modification of the second embodiment.

Also, as shown in FIG. 11, the female thread of the nuts 104F (104R) and the male thread of the feed screw 106 may be formed in the shape of square thread 191 in which the flanks 104b, 104c, 106b, and 106c extend perpendicular to the axis. In this case, the hydrostatic pressure generated in the thrust hydrostatic pressure pockets 107 can be effectively used as a force for providing thrust rigidity.

Obviously, numerous modifications and variations of the present invention are possible in light of the above teachings. It is therefore to be understood that within the scope of the appended claims, the present invention may be practiced otherwise than as specifically described herein.

What is claimed is:

1. A wheel-head feed mechanism for a grinder including a base and a wheel head which is guided by a linear guide section provided on said base and rotatably supports a grinding wheel, and including a wheel spindle driven by a motor, said wheel-head feed mechanism comprising:

a feed screw mechanism composed of a screw shaft and a nut unit engaged with said screw shaft, said feed screw mechanism advancing and retracting said wheel head with respect to a workpiece; and a servomotor for rotating one of said screw shaft and said nut unit, wherein said screw shaft is offset from said linear guide section toward said wheel spindle such that a distance between an axis of the wheel spindle and an axis of the screw shaft is not greater than one half the distance between the linear guide section and the axis of the wheel spindle, and said nut unit includes a radial hydrostatic bearing section for supporting a root of a male thread of said screw shaft in a radial direction of said screw shaft by means of hydrostatic pressure, and a thrust hydrostatic bearing section for supporting flanks of the male thread of said screw shaft in an axial direction of said screw shaft by means of hydrostatic pressure.

2. A wheel-head feed mechanism according to claim 1, wherein said screw shaft is offset from a center of said linear guide section toward said grinding wheel in a direction parallel to said wheel spindle.

3. A wheel-head feed mechanism according to claim 1, wherein said screw shaft is rotatably supported on said base; one end of said screw shaft is connected to said servomotor; a hole is formed from a rear end of said wheel head; said nut unit is fixed to an opening end of said hole such that the other end of said screw shaft passes through said nut unit and projects into said hole.

4. A wheel-head feed mechanism according to claim 1, wherein said nut unit includes a pair of nuts each having at one end thereof a flange portion for attachment to said wheel head by bolts, said one end being opposite the other end opposing the other nut; said radial hydrostatic bearing section is composed of a radial hydrostatic pressure pocket formed in a crest surface of a female thread of each nut; and said thrust hydrostatic bearing section is composed of a thrust hydrostatic pressure pocket formed in a flank of the female thread of each nut, said flank facing the flange portion of the corresponding nut.

5. A wheel-head feed mechanism according to claim 4, wherein each of said radial hydrostatic pressure pockets is composed of a plurality of elongated grooves formed at constant intervals in a circumferential direction of the nut; and each of said thrust hydrostatic pressure pockets is composed of a continuous spiral groove.

6. A wheel-head feed mechanism according to claim 4, wherein at least one of the flange portions of said nuts has a plurality of elongated holes, each of which extends in the circumferential direction and is adapted to receive said bolt.

7. A grinder comprising:

a base;

a workpiece support device for rotatably supporting a workpiece;

a wheel head which is guided by a linear guide section provided on said base and rotatably supports a grinding wheel, and including a wheel spindle disposed substantially parallel to an axis of said workpiece;

a feed screw mechanism composed of a screw shaft and a nut unit engaged with said screw shaft, said feed screw mechanism advancing and retracting said wheel head with respect to said workpiece; and a servomotor for rotating one of said screw shaft and said nut unit, wherein said screw shaft is offset from said linear guide section toward said wheel spindle such that a distance between an axis of the wheel spindle and an axis of the screw shaft is not greater than one half the distance between the linear guide section and the axis of the wheel spindle, and said nut unit includes a radial hydrostatic bearing section for supporting a root of a male thread of said screw shaft in a radial direction of said screw shaft by means of hydrostatic pressure, and a thrust hydrostatic bearing section for supporting flanks of the male thread of said screw shaft in an axial direction of said screw shaft by means of hydrostatic pressure.

8. A wheel-head feed mechanism according to claim 7, wherein said linear guide section includes a pair of first guide ways disposed such that the first guide ways are separated in a direction perpendicular to a feed direction of said wheel head and adapted to guide said wheel head along a predetermined horizontal plane, and a single second guide way disposed between said first guide ways and adapted to guide said wheel head along a straight line in said horizontal plane, and said screw shaft is offset from a center of said second guide way toward said grinding wheel in a direction parallel to said wheel spindle.

9. A grinder according to claim 8, wherein said wheel head is composed of a wheel head body and a wheel spindle support/drive unit, said wheel head body being guided by said linear guide section for horizontal movement and having a hole to which said nut unit is fixed and said wheel spindle support/drive unit being fixed at a front end portion of said wheel head body and including bearing means for rotatably supporting said wheel spindle, and wheel spindle drive means for rotating said wheel spindle.

10. A grinder according to claim 9, wherein said bearing means is composed of a pair of hydrostatic bearing units disposed within said wheel spindle support/drive unit such that they are separated in a horizontal direction perpendicular to the fed direction of said wheel head; and said wheel spindle drive means is composed of a motor disposed between said hydrostatic bearing units coaxially with said wheel spindle.

11. A grinder according to claim 7, wherein said screw shaft is rotatably supported on said base; one end of said screw shaft is connected to said servomotor; a hole is formed from the rear end of said wheel head; said nut unit is fixed to the opening end of said hole such that the other end of said screw shaft passes through said nut unit and projects into said hole.

12. A grinder according to claim 7, wherein said nut unit includes a pair of nuts each having at one end thereof a flange portion for attachment to said wheel head by bolts, said one end being opposite the other end opposing the other nut; said radial hydrostatic bearing section is composed of a radial hydrostatic pressure pocket formed in the crest surface of a female thread of each nut; and said thrust hydrostatic bearing section is composed of a thrust hydrostatic pressure pocket formed in a flank of the female thread of each nut, said flank facing the flange portion of the corresponding nut.

13. A grinder according to claim 12, wherein each of said radial hydrostatic pressure pockets is composed of a plurality of elongated grooves formed at constant intervals in the circumferential direction of the nut; and each of said thrust hydrostatic pressure pocket is composed of a continuous spiral groove.

* * * * *